US012442502B2

(12) United States Patent
Gatsios et al.

(10) Patent No.: US 12,442,502 B2
(45) Date of Patent: Oct. 14, 2025

(54) ILLUMINATION DEVICE FOR VEHICLES

(71) Applicant: Hella GmbH & Co. KGaA, Lippstadt (DE)

(72) Inventors: Sebastian Gatsios, Arnsberg (DE); Florian Herold, Bielefeld (DE); Dirk Kliebisch, Paderborn (DE); Ingo Möllers, Rietberg (DE); Alexander Schwan, Kamen (DE); Patrick Vogel, Unna (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 231 days.

(21) Appl. No.: 18/464,882

(22) Filed: Sep. 11, 2023

(65) Prior Publication Data

US 2024/0084988 A1 Mar. 14, 2024

(30) Foreign Application Priority Data

Sep. 12, 2022 (DE) ..................... 10102022123124.0

(51) Int. Cl.

| | |
|---|---|
| ***F21S 41/153*** | (2018.01) |
| ***F21S 41/125*** | (2018.01) |
| ***F21S 41/265*** | (2018.01) |
| ***F21S 41/663*** | (2018.01) |
| *F21W 102/20* | (2018.01) |
| *F21Y 113/13* | (2016.01) |

(52) U.S. Cl.

CPC ........... *F21S 41/153* (2018.01); *F21S 41/125* (2018.01); *F21S 41/265* (2018.01); *F21S 41/663* (2018.01); *F21W 2102/20* (2018.01); *F21Y 2113/13* (2016.08)

(58) Field of Classification Search

CPC ...... F21S 41/153; F21S 41/663; F21S 41/265; F21S 41/125; F21Y 2113/13; F21W 2102/20

See application file for complete search history.

(56) References Cited

U.S. PATENT DOCUMENTS

| | | | | |
|---|---|---|---|---|
| 8,721,130 B2 * | 5/2014 | Uchida | F21S 41/153 362/539 |
| 10,876,699 B2 * | 12/2020 | Spencer | B60Q 1/143 |

(Continued)

FOREIGN PATENT DOCUMENTS

| | | | |
|---|---|---|---|
| CN | 103090287 A * | 5/2013 | F21S 41/663 |
| CN | 117685527 A * | 3/2024 | F21S 41/40 |

(Continued)

*Primary Examiner* — Adam D Houston
(74) *Attorney, Agent, or Firm* — Husch Blackwell LLP

(57) ABSTRACT

An illumination device for vehicles is provided, and includes a headlamp with an imaging unit for generating a multitude of light pixels that can be actuated individually. The headlamp also includes a lens unit containing a lens arrangement with a number of lenses arranged in a fixed manner to each other. The light pixels of the imaging unit can be mapped to focused light spots at a specified distance. The headlamp also includes an actuator unit for actuating the imaging unit. A first lens unit of a first headlamp is different from a second lens unit of a second headlamp such that the light pixels of the imaging unit of the first headlamp and the second headlamp are mapped to be focused at different distances.

13 Claims, 1 Drawing Sheet

(56) References Cited

U.S. PATENT DOCUMENTS

| | | | | | |
|---|---|---|---|---|---|
| 11,005,016 | B2 * | 5/2021 | Steudel | ................ | H10H 20/857 |
| 11,988,350 | B2 * | 5/2024 | Jeong | ..................... | F21S 41/285 |
| 2014/0268850 | A1 * | 9/2014 | Marley | ................. | F21S 41/336 362/516 |
| 2015/0078024 | A1 * | 3/2015 | Mugge | ..................... | F21S 43/14 362/520 |
| 2018/0347777 | A1 * | 12/2018 | Chen | ........................ | F21S 41/25 |
| 2021/0215314 | A1 * | 7/2021 | Schreiber | .............. | F21S 41/663 |
| 2022/0400542 | A1 * | 12/2022 | Ritoniemi | .......... | G02B 27/0961 |
| 2024/0084988 | A1 * | 3/2024 | Gatsios | ................. | F21S 41/265 |

FOREIGN PATENT DOCUMENTS

| | | | | | |
|---|---|---|---|---|---|
| CN | 118775800 | A | * | 10/2024 | .............. F21V 5/048 |
| DE | 102011004086 | B4 | | 1/2014 | |
| DE | 102013222467 | A1 | | 5/2015 | |
| DE | 102016211653 | A1 | | 12/2017 | |
| DE | 102017118535 | A1 | * | 2/2018 | ............. B60Q 1/076 |
| DE | 102018008760 | A1 | | 4/2019 | |
| DE | 102020100762 | A1 | | 7/2021 | |
| DE | 102020110900 | A1 | * | 11/2021 | .............. F21S 41/20 |
| EP | 2666671 | A1 | * | 11/2013 | ............ F21S 41/663 |
| EP | 3757451 | A1 | | 12/2020 | |
| EP | 4459180 | A1 | * | 11/2024 | ............... B60Q 1/04 |
| KR | 102706415 | B1 | * | 9/2024 | ........... G02B 3/0006 |
| WO | WO-2022152355 | A1 | * | 7/2022 | .............. F21V 14/02 |

* cited by examiner

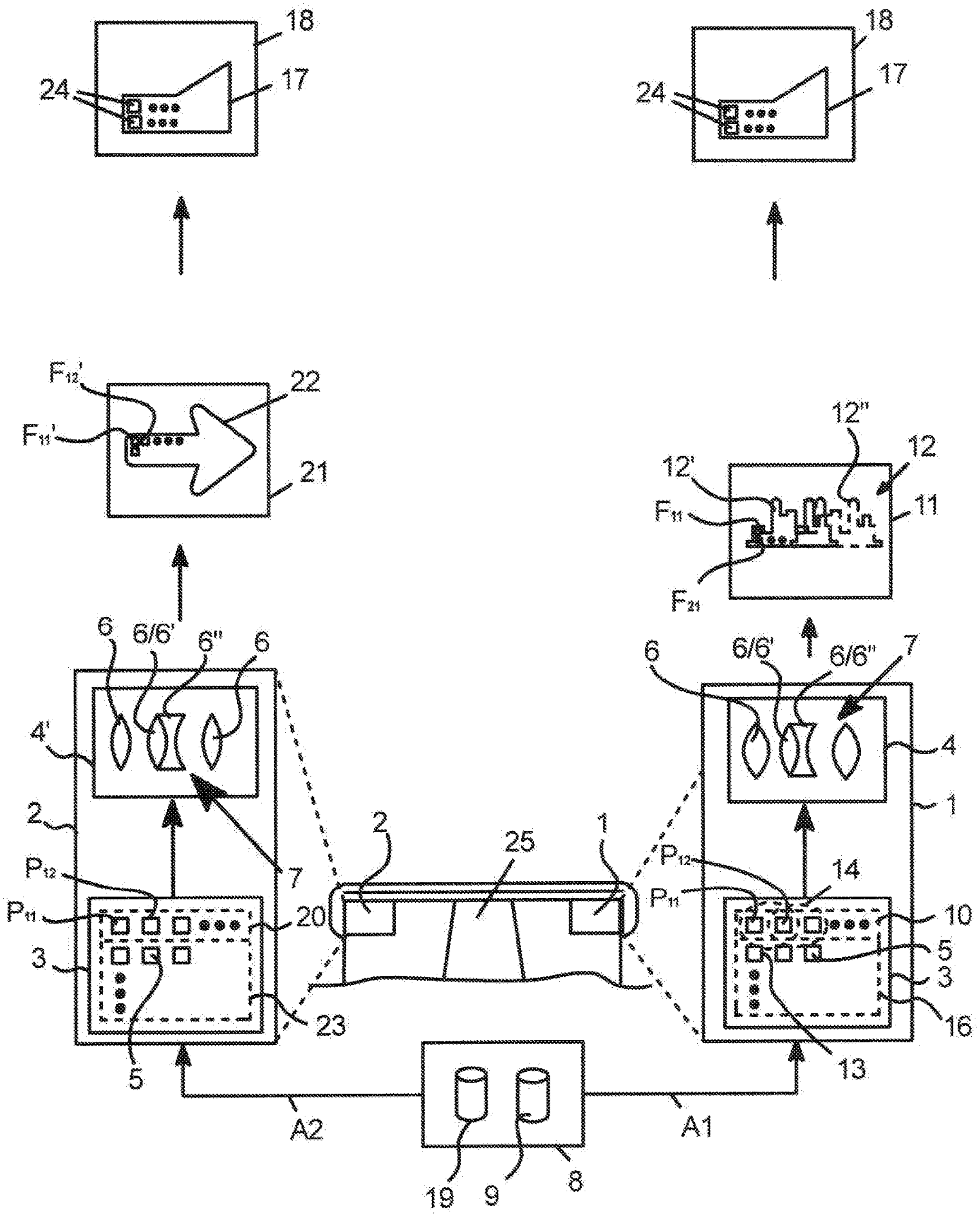
18
17
24
18
17
24
F12'
F11'
22
21
12"
12
12'
F11
11
F21
6
6/6'
6"
6
6
6/6'
6/6"
7
4'
4
2
1
P12
P11
20
3
23
5
7
2
25
1
P12
14
P11
10
5
3
16
13
A2
A1
19
9
8

ILLUMINATION DEVICE FOR VEHICLES

CROSS REFERENCE

This application claims priority to German Application No. 10 2022 123124.0, filed Sep. 12, 2022, the entirety of which is hereby incorporated by reference.

FIELD OF THE INVENTION

The invention relates to an illumination device for vehicles, containing a headlamp with an imaging unit for generating a multitude of light pixels that can be actuated individually, with an optical unit containing a lens arrangement with a number of lenses arranged in a fixed manner to each other, by means of which the light pixels of the imaging unit can be mapped to light patches focused at a specified distance, and with an actuator unit for actuating the imaging unit.

BACKGROUND OF THE INVENTION

DE 10 2018 008 760 A1 discloses an illumination device for vehicles that, as an imaging unit, features a plurality of light sources arranged in a field. Upstream of the imaging unit there is an optical unit that is fashioned as a lens arrangement with a plurality of lens groups. These lens groups are arranged in the direction of the optical axis in a manner that they can be shifted relative to each other such that different focal lengths of the optical unit can be set. In this way, it is possible to map in focus objects arranged at varying distances in the area ahead of the vehicle.

DE 10 2020 100 762 A1 discloses an illumination device for vehicles that consists of several modules. In addition to a module for generating a specified light distribution, for example a low-beam light distribution, etc., a module is provided for generating a focused mapping. This features an imaging unit for generating a multitude of light pixels that can be actuated individually and an optical unit containing a lens arrangement with a number of lenses arranged in a fixed manner to each other. This specifies a depth of focus of the optical unit if the assumption is made that an aperture of the optical unit is reduced to a minimum. An actuator unit is provided to correspondingly actuate the light pixels of the imaging unit. Depending on the arrangement and design of the lenses, the light pixels can be mapped in focus at differing distances. One disadvantage of the known illumination device is that a relatively large installation space is required and it is relatively expensive to map the light pixels in focus at differing distances.

BRIEF SUMMARY OF THE INVENTION

The task of the present invention is consequently to refine an illumination device for vehicles to provide a simple manner of ensuring a focused mapping of light pixels at differing distances without refocusing.

To solve this task, a first headlamp is fashioned as a right headlamp that is arranged in a right corner area of the vehicle and in that a second headlamp is fashioned as a left headlamp that is arranged in a left corner area of the vehicle, wherein a first optical unit of the right headlamp is fashioned differently from a second optical unit of the left headlamp in such a way that the light pixels of the imaging unit of the right headlamp and the left headlamp are mapped to be focused at different distances.

In accordance with the invention, a right headlamp and a left headlamp of a vehicle are fashioned differently. They feature differing optical units such that light pixels of the right or, as the case may be, the left headlamp generated by an imaging unit can be mapped to be focused at different distances. The optical unit of the right headlamp thus features a different focal length to the optical unit of the left headlamp. As an advantage, this makes it possible to achieve a focused mapping of the light pixels at differing distances in a simple manner that saves space.

In accordance with a preferred embodiment of the invention, an actuator unit features a first actuator, such that a first part of the light pixels of the imaging unit of the right headlamp is actuated in such a way that the first part of the light pixels are mapped to be focused in a first near field. Furthermore, the actuator unit features a second means of actuation, such that a first part of the light pixels of the imaging unit of the left headlamp is actuated in such a way that this first part of the light pixels are mapped to be focused in a second near field. The second near field is arranged at a greater distance to the left headlamp than the first near field to the right headlamp. As an advantage, this make it possible to map so as to be focused in near fields at differing distances, for example, symbols, sequences of images or images for signal purposes.

In accordance with a refinement of the invention, the actuator unit features an actuator for the imaging unit of the right headlamp and of the left headlamp such that a specified light distribution is generated in a far field. This ensures that in a driving status of the vehicle, for example, a low-beam light distribution, a glare-free high-beam light distribution, an urban light distribution or a rural road light distribution are always generated. By changing the actuation of the light pixels of the imaging unit of the right headlamp and/or the left headlamp, it is thus possible to create the specified light distribution and potentially additionally a mapping in the first near field and/or the second near field. The mapping in the first near field and/or in the second near field can be, for example, a symbol, for example, an arrow or a further sign, for example as a warning signal for the driver of the vehicle or for other road users.

In accordance with a refinement of the invention, the actuator unit features a first actuator program for generating first actuation such that a sequence of moving images is generated in the first near field. In this way, it is possible for example to use a wall, for example a garage wall, as a "screen" when the vehicle is stationary.

In accordance with a refinement of the invention, the imaging unit can feature a multitude of LED light sources, in particular RGB-LED light sources, such that the mappings in the first near field and/or second near field can be made in colour.

In a refinement of the invention, the optical unit features at least four lenses, wherein at least one convex lens and a concave lens are provided for forming an achromatic lens. In this way, it is possible to compensate for colour errors.

BRIEF DESCRIPTION OF THE DRAWINGS

Reference is now made more particularly to the drawings, which illustrate the best presently known mode of carrying out the invention and wherein similar reference characters indicate the same parts throughout the views. One sample embodiment of the invention is explained in more detail in the following using the drawings.

FIG. 1 is a block diagram of the inventive illumination device.

DETAILED DESCRIPTION OF THE DRAWINGS

An inventive illumination device for vehicles 25 comprises a first headlamp that is arranged as a right headlamp 1 in a right corner area at a front of the vehicle 25 and a second headlamp fashioned as a left headlamp 2 that is arranged in a second corner area of a front of the vehicle 25. The right headlamp 1 and the left headlamp 2 feature in each case a housing in which an imaging unit 3 and an optical unit 4, 4' are arranged. The imaging unit 3 of the right headlamp 1 and the imaging unit 3 of the left headlamp 2 are fashioned identically and are consequently marked with the same reference number. The imaging unit 3 features a plurality of light sources 5, in particular Light sources, arranged in the form of a matrix. In each case, the light sources 5 form light pixels $P_{11}$, $P_{12}$, . . . $P_{nm}$ that are mapped by means of the optical unit 4, 4'.

In accordance with an alternative embodiment of the invention (not shown), the imaging unit 3 can also feature a liquid crystal unit (LCD display) or as an LCoS (liquid crystal on silicon) unit and a light source unit. In this context, the liquid crystal elements arranged in the form of a matrix or in the form of pixels serve as aperture elements that either let light from the light source through or block it. As an alternative, the imaging unit 3 can feature a light source unit and a micromirror device (DMD), wherein individual micromirror elements of the micromirror elements are arranged in the form of a matrix or in the form of pixels in the range of several millions such that it can be swivelled. The micromirror elements have at least one on state in which the light from the light source unit is directed onto the optical unit 4, 4', and at least one off state in which the light emitted by the light source unit is absorbed. The mapping of the imaging unit 3 creates a high resolution right headlamp 1 and a high resolution left headlamp 2.

The right headlamp 1 features a first optical unit 4 that consists of a lens arrangement with a plurality of lenses 6. The left headlamp 2 features a second optical unit 4' that—like the first optical unit 4—features a plurality of lenses 6. In the present sample embodiment, the first optical unit 4 and the second optical unit 4' each feature four lenses 6, wherein a first convex lens 6' and a second convex lens 6" form an achromatic lens 7 to compensate for a colour error.

The first optical unit 4 and the second optical unit 4' differ in that at least one lens 6 is fashioned to be shaped differently such that the first optical unit 4 and the second optical unit 4' feature a different focal length.

The higher focal length of the second optical unit 4' has the effect that the light pixels $P_{11}$, $P_{12}$, . . . $P_{nm}$ of the imaging unit 3 of the left headlamp 2 are mapped to be focused at such a distance to the left headlamp 2 that is at least three times as long as the distance at which light pixels $P_{11}$, $P_{12}$, . . . $P_{nm}$ of the imaging unit 3 of the right headlamp 1 are mapped to be focused.

Furthermore, the illumination device comprises an actuator unit 8 that is arranged outside of the right headlamp 1 and the left headlamp 2 or in the right headlamp 1 or in the left headlamp 2. Optionally, the actuator unit 8 can consist of two actuator units each of which are arranged in the right headlamp 1 and the left headlamp 2.

The actuator unit 8 features a first actuator program 9 that is integrated in a microcontroller such that the first actuation A1 are generated by means of which a first part 10 of the light pixels $P_{11}$, $P_{12}$, . . . $P_{nm}$ of the imaging unit 3 of the right headlamp 1 are actuated in such a way that this first part 10 of the light pixels $P_{11}$, $P_{12}$, . . . $P_{nm}$ are mapped in a first near field 11 to a focused mapping. In the present sample embodiment, the focused mapping a sequence of images 12 moving in a direction crosswise to the vehicle axis, containing a plurality of light patches $F_{11}$, $F_{12}$, . . . $F_{nm}$ arranged adjacent to each other. The first near field 11 can be arranged in an area at a distance of 3 m to the right headlamp 1 such that a wall or garage wall can be used as a "screen" for showing a film or a sequence of images. As the moving image 12 is generated by light pixels $P_{11}$, $P_{12}$, . . . $P_{nm}$ actuated at different times, the first part 10 of the light sources 5 consists of a first part segment 13, a second part segment 14 and, where applicable, further part segments that are actuated or switched on in a dimmed state successively by the actuation A1. In this way, a first image 12' of the moving image 12 corresponds to the first part segment 13 and a second image 12" of the moving image 12 to the second part segment 14.

A second part 16 of the light pixels$_{11}$, $P_{12}$, . . . $P_{nm}$ arranged in the imaging unit 3 of the right headlamp 1 is actuated by the actuator A1 in such a way that a specified light distribution 17 is generated in a far field 18. The light distribution 17 can be, for example, a low-beam light distribution or a glare-free high-beam light distribution or an urban light distribution or the like. The far field 18 is located at a greater distance to the right headlamp 1 than the first near field 11.

The actuator unit 8 features a second actuator program 19 for generating actuation A2, by means of which light sources 5 of the imaging unit 3 arranged in the left headlamp 2 are actuated. By means of the second actuator program 19, a first part 20 of the light sources 5 of the imaging unit 3 of the left headlamp 2 is actuated in such a way that this part 20 of the light sources 5 are mapped to be focused in a second near field 21 to a mapping with a plurality of light patches $F_{11}$, $F_{12}$, . . . $F_{nm}$ arranged adjacent to each other. This mapping can be, for example, a symbol, in particular an arrow 22, that is projected onto the road surface and acts as an information or warning signal for the driver of the vehicle 25. The second near field 21 can be arranged in an area at a distance between 10 m and 15 m to the left headlamp 2. It is at a distance of more than three times as far from the left headlamp 2 emitting the corresponding light than the first near field 11 from the right headlamp 1.

In addition, the second actuator program 19 is designed in such a way that a second part 23 of the light sources 5 of the imaging unit 3 of the left headlamp 2 are actuated by means of the actuator A2 such that the corresponding light sources 5 are mapped by means of the second optical unit 4' to the light distribution 17 in the far field 18. The first optical unit 4 and the second optical unit 4' thus form the same light distribution 17, such that the actual main function of the right headlamp 1 and of the second left headlamp 2 are fulfilled. The secondary function of the right headlamp 1 is the mapping of an image in the first near field 11 and the secondary function of the left headlamp 2 is the mapping of an image in the second near field 21. The mapping of the images in the first near field 11 and the second near field 21 can be performed independently of each other and independently of the mapping of the light distribution 17 in the far field 18.

The symbol 22 consists of a plurality of light patches $F_{11}'$, $F_{12}'$, . . . $F_{nm}'$ mapped to be focused.

The light patches $F_{11}$, $F_{12}$, . . . $F_{nm}$ or, as the case may be, $F_{11}'$, $F_{12}'$, . . . $F_{nm}'$ are considerably smaller in their dimensions that the light patches 24 of the light distribution 17.

The mapping of the light pixels to light patches 24 of the light distribution 17 in the far field 18 is relatively unfocused, which is accepted as harmonious illumination over an area is the crucial factor. A correspondingly high resolution of the light pixels with increasing numbers of light sources makes it possible, for example, to create the light distribution as a glare-free high-beam light distribution leaving out objects recognised ahead of the vehicle. The far field 18 is at a distance further away from the respective headlamp 1 or 2, than the first near field 11 and the second near field 21 from the respective headlamps 1 or 2.

In accordance with an alternative embodiment of the invention (not shown), the imaging unit 3 of the right headlamp 1 can feature a different number of light sources 5 than the imaging unit 3 of the left headlamp 2. For example, the imaging unit 3 of the right headlamp 1 can feature a permanently allocated first part 10 of the light sources 5 for generating the image in the first near field 11 and a permanently allocated second part 16 of the light sources 5 for generating the light distribution in the far field 18. Dual use of the light sources 5 for generating the first near field 11 and for generating the light distribution 17 is not provided for in this case.

In accordance with an alternative embodiment of the invention, the first optical unit 4 can also be arranged in the left headlamp 2 and the second optical unit 4' in the right headlamp 1.

LIST OF REFERENCE NUMBERS

1 Right headlamp
2 Left headlamp
3 Imaging unit
4,4' Optical unit
5 Light sources
6,6',6" Lenses
7 Achromatic lens
8 Actuator unit
9 First actuator program
10 First part
11 First near field
12,12',12" moving images
13 First part segment
14 Second part segment
15 3. part segment
16 Second part
17 light distribution
18 Far field
19 Second actuator program
20 First part
21 Second near field
22 Symbol
23 Second part
24 Light patches
25 Vehicle
$P_{11}, P_{12}, \ldots P_{nm}$ Light pixels
A1,A2 Actuator
$F_{11}, F_{12}, \ldots F_{nm}$ Light patches
$F_{11}', F_{12}', \ldots F_{nm}'$

We claim:

1. An illumination device for vehicles, the illumination device comprising:

a first headlamp and a second headlamp, each of said first and second headlamps including:

an imaging unit for generating a multitude of light pixels ($P_{11}, P_{12}, \ldots P_{nm}$) that can be actuated individually;

a lens unit containing a lens arrangement with a number of lenses arranged in a fixed manner to each other by which the light pixels ($P_{11}, P_{12}, \ldots P_{nm}$) of the imaging unit are mapped to focused light spots ($F_{11}$, $F_{12}$, $F_{11}'$, $F_{12}'$) at a specified distance; and an actuator unit for actuating the imaging unit, wherein the first headlamp is arranged in a first corner area of the vehicle and the second headlamp is arranged in a second corner area of the vehicle, wherein the respective light pixels ($P_{11}, P_{12}, \ldots P_{nm}$) of the imaging unit of the first headlamp and of the second headlamp are mapped to be focused at different distances.

2. The illumination device in accordance with claim 1, wherein the imaging unit of the first headlamp is identical to the imaging unit of the second headlamp, and wherein corresponding light sources of the imaging unit of the first headlamp and of the second headlamp arranged at the same place are mapped to be focused at different distances.

3. The illumination device in accordance with claim 1, wherein the actuator unit includes a first actuator (A1) such that a first part of the light pixels ($P_{11}, P_{12}, \ldots P_{nm}$) of the imaging unit of the first headlamp are actuated such that the first part of the light pixels ($P_{11}, P_{12}, \ldots P_{nm}$) are mapped in a first near field, and the actuator unit includes a second actuator (A2) such that a first part of the light pixels ($P_{11}, P_{12}, \ldots P_{nm}$) of the imaging unit of the second headlamp are actuated such that the first part of the light pixels ($P_{11}, P_{12}, \ldots P_{nm}$) are mapped to be focused in a second near field, wherein the second near field is arranged at a distance at least three times as far to the left headlamp as the first near field to the right headlamp.

4. The illumination device in accordance with claim 1, wherein the actuator unit includes an actuator such that a second part of the light pixels ($P_{11}, P_{12}, \ldots P_{nm}$) of the imaging unit of the first headlamp and of the second headlamp are actuated in such a way that the specified light distribution is generated in a far field.

5. The illumination device in accordance with claim 3, wherein the actuator unit includes a first actuator program for actuating the actuator (A1) such that in a first near field, a moving image is generated that is composed in each case of the light pixels ($P_{11}, P_{12}, \ldots P_{nm}$) mapped from light patches ($F_{11}, F_{12}, \ldots F_{nm}$) of differing part segments of the first part of the imaging unit.

6. The illumination device in accordance with claim 3, wherein the actuator unit includes a second actuator program for actuating the second actuator (A2) such that in a second near field, a symbol is generated that is composed of the first part of the light pixels ($P_{11}, P_{12}, \ldots P_{nm}$) of the imaging unit mapped from light patches ($F_{11}, F_{12}, \ldots F_{nm}$).

7. The illumination device in accordance with claim 3, wherein the first near field is arranged in the area of a distance of 3 m to the first headlamp.

8. The illumination device in accordance with claim 3, wherein the second near field is arranged in the area of a distance between 10-m and 15-m the second headlamp.

9. The illumination device in accordance with claim 1, wherein the imaging unit includes a plurality of light sources arranged in the form of a matrix.

10. The illumination device in accordance with claim 9, wherein the light sources are RGB light sources.

11. The illumination device in accordance with claim 6, wherein the second actuator program is designed in such a way that the symbol in the second near field and the light distribution are generated in the far field.

12. The illumination device in accordance with claim 1, wherein the optical unit includes a lens arrangement including at least four lenses.

13. The illumination device in accordance with claim 12, wherein the lens arrangement includes at least one convex lens and one concave lens to form an achromatic lens.

* * * * *